United States Patent
Tanimoto et al.

(10) Patent No.: US 8,032,703 B2
(45) Date of Patent: Oct. 4, 2011

(54) STORAGE APPARATUS AND FAILURE RECOVERY METHOD

(75) Inventors: Daisuke Tanimoto, Odawara (JP); Takuya Okaki, Ooiso (JP)

(73) Assignee: Hitachi, Ltd., Tokyo (JP)

( * ) Notice: Subject to any disclaimer, the term of this patent is extended or adjusted under 35 U.S.C. 154(b) by 483 days.

(21) Appl. No.: 12/219,502

(22) Filed: Jul. 23, 2008

(65) Prior Publication Data

US 2009/0307420 A1 Dec. 10, 2009

(30) Foreign Application Priority Data

Jun. 5, 2008 (JP) ................................. 2008-147808

(51) Int. Cl.
*G06F 12/00* (2006.01)
(52) U.S. Cl. ............................. 711/114; 714/2; 714/6.22
(58) Field of Classification Search .................. 711/114; 714/2, 3, 6.1, 6.22
See application file for complete search history.

(56) References Cited

U.S. PATENT DOCUMENTS

| 2002/0073279 A1 | 6/2002 | Sasamoto et al. |
| 2003/0105921 A1 | 6/2003 | Tomita |
| 2006/0117216 A1 * | 6/2006 | Ikeuchi et al. ................... 714/6 |

FOREIGN PATENT DOCUMENTS

| JP | 2002-175158 | 12/2000 |
| JP | 2003-167690 | 11/2001 |

* cited by examiner

*Primary Examiner* — Jasmine Song
(74) *Attorney, Agent, or Firm* — Stites & Harbison PLLC; Juan Carlos A. Marquez, Esq.

(57) ABSTRACT

Proposed are a storage apparatus and a failure recovery method capable of performing failure recovery processing while reducing performance deterioration. Whether user data is written into a storage area provided by multiple storage mediums is managed for each stripe. When any one of the storage mediums is blocked due to a failure, correction copy processing is executed to the stripe written with the user data in preference to the stripe not written with the user data in a storage area provided by the multiple storage mediums, and correction copy processing is executed to the stripe not written with the user data in a storage area provided by the multiple storage mediums during spare time.

8 Claims, 14 Drawing Sheets

FIG.4
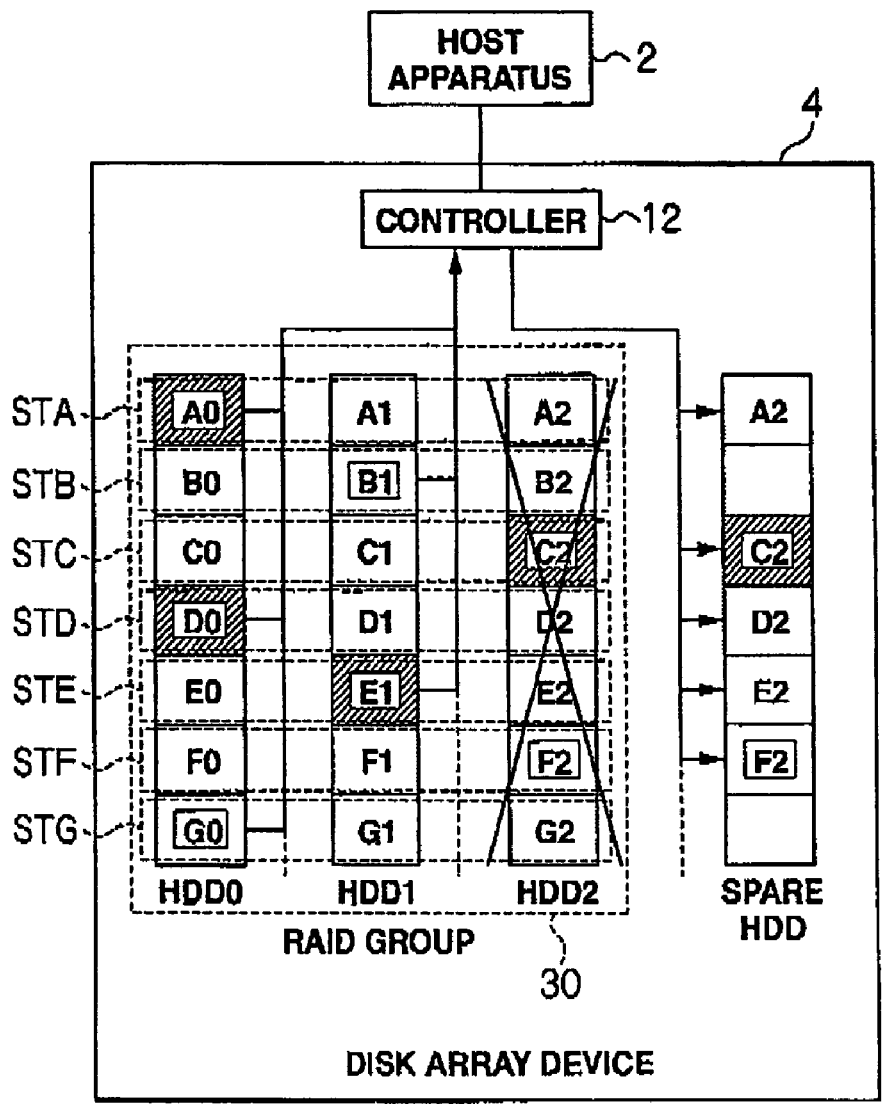
: PARITY SECTION WITH WRITE MANAGEMENT FLAG TURNED ON
: PARITY SECTION WITH WRITE MANAGEMENT FLAG TURNED OFF
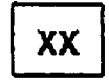
: USER DATA SECTION

FIG.7

| GROUP ID | DATA DISK WIDTH | RAID LEVEL |
|---|---|---|
| 1 | 4 | RAID5 |
| 2 | 8 | RAID6 |
| ⋮ | ⋮ | ⋮ |

| STRIPE ID | HDD ID | LBA | PARITY FLAG |
|---|---|---|---|
| 1 | 1 | 1 | 1 |
|  | 2 | 1 | 0 |
|  | 3 | 1 | 0 |
|  | 4 | 1 | 0 |
| 2 | 1 | 2 | 0 |
|  | 2 | 2 | 1 |
|  | 3 | 2 | 0 |
|  | 4 | 2 | 0 |
| ⋮ | ⋮ | ⋮ | ⋮ |

[FAILURE RECOVERY STATUS]

HDD0: NORMAL
HDD1: NORMAL
HDD2: NORMAL
HDD3: RECOVERING (RATE OF PROGRESS: 50%)
HDD4: NORMAL
HDD5: NORMAL
HDD6: NORMAL
HDD7: BLOCKED
HDD8: NORMAL
HDD9: NORMAL
 •
 •
 •

60

STORAGE APPARATUS AND FAILURE RECOVERY METHOD

CROSS-REFERENCES

This application relates to and claims priority from Japanese Patent Application No. 2008-147808, filed on Jun. 5, 2008, the entire disclosure of which is incorporated herein by reference.

BACKGROUND

The present invention generally relates to a storage apparatus and a failure recovery method, and in particular can be suitably applied to a disk array device.

In recent years, as a storage apparatus for storing data in corporations and government offices, a so-called disk array device in which a plurality of hard disk devices are managed and operated in RAID (Redundant Array of Inexpensive Disks) format is being widely used.

With a disk array device, a single RAID group is configured from a prescribed number of hard disk devices, and one or more logical volumes (hereinafter referred to as "logical volumes") are defined in a storage area provided by the respective hard disk devices configuring one RAID group.

User data from a host apparatus is partitioned into the same size as a block, which is a unit for reading and writing data in the hard disk device, and distributively written into the respective hard disk devices configuring the RAID group together with redundant data (hereinafter referred to as "parity data") created based on such user data.

As a result of this parity data, even if one or two of the hard disk devices configuring the RAID group are blocked due to a failure, user data stored in the hard disk device which has been blocked (hereinafter referred to as the "blocked hard disk device" as appropriate) can be restored based on the corresponding user data and the corresponding parity data stored in the other hard disk devices.

Japanese Patent Laid-Open Publication No. 2003-167690 and Japanese Patent Laid-Open Publication No. 2002-175158 disclose inventions related to the technology of recovering data stored in a blocked hard disk device using the foregoing parity data.

SUMMARY

Meanwhile, with a conventional disk array device, restoration of data is performed to all storage areas of the blocked hard disk device regardless of whether user data is stored therein, and the failure recovery processing is ended at the point in time that the recovered data is completely stored in a spare hard disk device (hereinafter referred to as a "spare hard disk device").

Thus, according to the conventional failure recovery method, since data restoration processing is also performed to storage areas not written with user data, there is a problem in that much time is required to perform the failure recovery processing. Particularly in recent years, the time required for the failure recovery processing is of an increasing trend due to the increase in the capacity of hard disk devices.

In such a case, the processing performance of the data I/O processing according to a request from the host apparatus will deteriorate during the failure recovery processing. Accordingly, if the time required for the failure recovery processing increases, the deteriorated status of the processing performance of the data I/O processing will continue for a longer period of time.

The present invention was made in view of the foregoing points. Thus, an object of the present invention is to propose a storage apparatus and a failure recovery method capable of performing failure recovery processing while reducing performance deterioration.

In order to achieve the foregoing object, the present invention provides a storage apparatus which distributively writes user data provided from a host apparatus, together with redundant data created based on the user data, into a plurality of storage mediums This storage apparatus comprises a management unit for managing whether the user data is written in each stripe, which is a unit area for reading and writing the user data, in a storage area provided by the plurality of storage mediums, and a correction copy processing execution unit for executing to each of the stripes correction copy processing of recovering, when any one of the storage mediums is blocked due to a failure, data stored in that storage medium and copying the data to a spare storage medium. The correction copy execution unit executes the correction copy processing to the stripe written with the user data in preference to the stripe not written with the user data in a storage area provided by the plurality of storage mediums, and executes the correction copy processing to the stripe not written with the user data in a storage area provided by the plurality of storage mediums during its spare time.

Consequently, according to this storage apparatus, it is possible to shorten the time that the processing performance of the data I/O processing will deteriorate as a result of executing the correction copy processing.

The present invention additionally provides a failure recovery method in a storage apparatus which distributively writes user data provided from a host apparatus, together with redundant data created based on the user data, into a plurality of storage mediums. This failure recovery method comprises a first step of managing whether the user data is written in each stripe, which is a unit area for reading and writing the user data, in a storage area provided by the plurality of storage mediums, and a second step of executing to each of the stripes correction copy processing of recovering, when any one of the storage mediums is blocked due to a failure, data stored in that storage medium and copying the data to a spare storage medium. At the second step, the correction copy processing is executed to the stripe written with the user data in preference to the stripe not written with the user data in a storage area provided by the plurality of storage mediums, and the correction copy processing is executed to the stripe not written with the user data in a storage area provided by the plurality of storage mediums during spare time.

Consequently, according to this failure recovery method, it is possible to shorten the time that the processing performance of the data I/O processing will deteriorate as a result of executing the correction copy processing.

According to the present invention, since it is possible to shorten the time that the processing performance of the data I/O processing will deteriorate as a result of executing the correction copy processing, the failure recovery processing can be executed while reducing performance deterioration.

DESCRIPTION OF DRAWINGS

FIG. 4 is a conceptual diagram explaining a failure recovery method according to an embodiment of the present invention when the RAID level of the failed RAID group is RAID 5;

FIG. 7 is a conceptual diagram showing the configuration of a RAID group management table;

FIG. 8 is a conceptual diagram showing the configuration of a stripe management table;

FIG. 15 is a schematic diagram showing the screen configuration of a failure recovery status display screen.

DETAILED DESCRIPTION

An embodiment of the present invention is now explained with reference to the attached drawings.

(1) Configuration of Storage System in Present Embodiment

Figure 1:
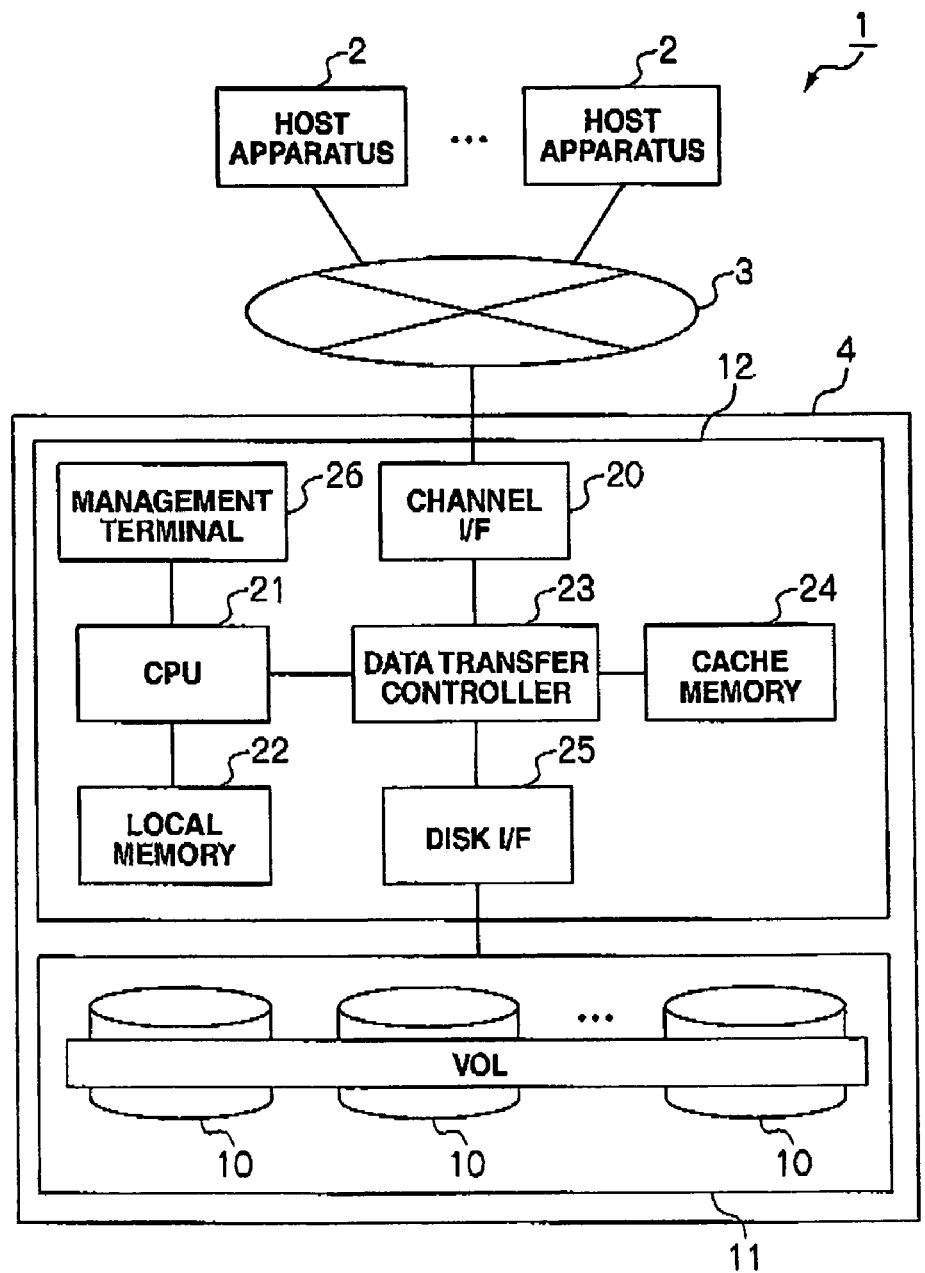
FIG. 1 is a block diagram showing the overall configuration of an information processing system according to an embodiment of the present invention.

FIG. 1 shows the overall information processing system 1 according to an embodiment of the present invention. The information processing system 1 is configured by a host apparatus 2 as a host system being connected to a disk array device 4 via a network 3.

The host apparatus 2 is a mainframe computer device comprising information processing resources such as a CPU (Central Processing Unit) and a memory, and comprises an information input device (not shown) such as a keyboard, a switch, a pointing device, or a microphone, and an information output device (not shown) such as a monitor display or a speaker.

The network 3 is configured from a SAN (Storage Area Network), a LAN (Local Area Network), Internet, a public line, a dedicated line or the like. Communication between the host apparatus 2 and the disk array device 4 via the network 3 is conducted according to a fibre channel protocol if the network 3 is a SAN, and conducted according to a TCP/IP (Transmission Control Protocol/Internet Protocol) protocol if the network 3 is a LAN.

The disk array device 4 comprises a storage unit 11 configured from a plurality of hard disk devices 10, and a controller 12 for controlling the input and output of data into and from the hard disk devices 10.

The hard disk device 10 is configured from an expensive hard disk device such as a SCSI (Small Computer System Interface) disk or an inexpensive hard disk device such as a SATA (Serial AT Attachment) disk. The hard disk devices 10 of the storage unit 11 are operated and managed in RAID format by the controller 12.

A single RAID (Redundant Array of Inexpensive Disks) group is configured from a prescribed number of hard disk devices 10, and one or more logical volumes (hereinafter referred to as the "logical volumes") VOL are defined in a storage area provided by the respective hard disk devices 10 configuring one RAID group. User data from the host apparatus 2 is read from and written into the logical volumes VOL in prescribed-size block units.

A unique identifier (LUN: Logical Unit Number) is allocated to each logical volume VOL. In this embodiment, the I/O of user data is performed by combining the foregoing identifier and a unique number (LBA: Logical Block Address) allocated to each block as the address, and designating such address.

The controller 12 comprises a channel interface 20, a CPU 21, a local memory 22, a data transfer controller 23, a cache memory 24, a disk interface 25 and a management terminal 26.

The channel interface 20 is an interface to the network 3, and is used for sending and receiving user data to be read from and written into the hard disk device 10 as well as various commands to and from the host apparatus 2.

The CPU 21 executes control processing according to various commands sent from the host apparatus 2 by executing micro programs read from the hard disk device 10 into the local memory 22.

The local memory 22 is primarily used for storing the micro programs described later, and also as a work memory of the CPU 21. The data transfer controller 23 controls the data transfer between the channel interface 20 and the disk interface 25 based on the control of the CPU 21.

The cache memory 24 is used for temporarily storing data to be transferred between the channel interface 20 and the disk interface 25. The cache memory 24 also stores information (system information) concerning the system configuration of the disk array device 4.

The disk interface 25 is an interface to the respective hard disk devices 10 and, for instance, exchanges user data and various commands with the hard disk devices 10 according to a fibre channel protocol.

The management terminal 26 is configured from a laptop personal computer or the like. The management terminal 26 collects information concerning the existence of a failure in the disk array device 4 via the CPU 21, and displays necessary information. The management terminal 26 also displays necessary information according to a request from the CPU 21.

(2) Failure Recovery Method of Present Embodiment

In a case where any one of the hard disk devices 10 is blocked due to a failure, the recovery processing from such a failure (hereinafter referred to as the "failure recovery method" in this embodiment) to be performed in the disk array device 4 is now explained.

Figure 2:
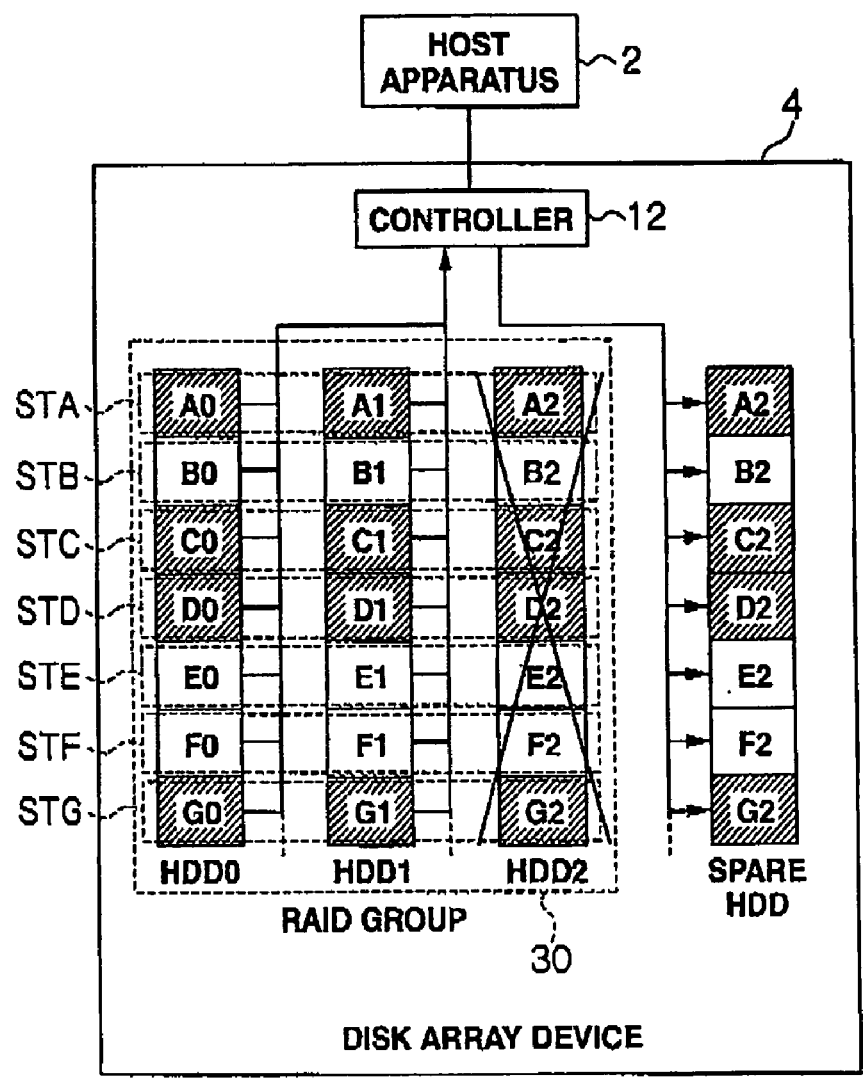
FIG. 2 is a conceptual diagram explaining a conventional failure recovery method.

A conventional failure recovery method is foremost explained with reference to FIG. 2. FIG. 2 shows a case where, in a RAID group 30 configured from three hard disk devices 10 of "HDD0" to "HDD2," the hard disk device 10 of "HDD2" is blocked due to a failure. Let it be assumed that the RAID group 30 is set to a RAID level of "RAID 5" or "RAID 6." in FIG. 2, let it also be assumed that A0 to A2, B0 to B2, C0 to C2, . . . represent the blocks respectively configuring one stripe STA, STB, STC, . . . . Incidentally, the term "stripe" refers to a unit of the storage area upon reading and writing, in RAID format user data from and into a storage area provided by the RAID group 30.

In this case; the controller 12 of the disk array device 4 sequentially reads the user data and parity data stored in the respective blocks configuring the top stripe of "STA" from the respective hard disk devices 10 other than the hard disk device 10 that was blocked due to a failure. For instance, in the case of FIG. 2, since the hard disk device 10 of "HDD2" is blocked, the controller 12 reads the user data and parity data from the block of "A0" in the hard disk device 10 of "HDD0" and from the block of "A1" in the hard disk device 10 of "HDD1," respectively.

Subsequently, the controller 12 restores the user data or parity data stored in the block of "A2" in the blocked hard disk device 10 based on the user data or parity data read respectively from the block of "A0" and the block of "A1," and writes this into the corresponding block of "A3" in the spare hard disk device 10 of "HDD3."

The controller 12 thereafter sequentially performs the foregoing processing to each stripe (STA, STB, . . . ) subsequent to "ST0" (processing of restoring the user data and parity data stored in the hard disk device 10 blocked due to a failure based on the user data and parity data stored in the respective hard disk devices 10 other than the blocked hard disk device 10 and copying such user data and parity data to a spare hard disk device 10 is hereinafter referred to as "correction copy processing").

Here, the controller 12 also performs the same correction copy processing to stripes not written with user data. For instance, in the case of FIG. 2, although the stripe of "STB" is not written with user data, the controller 12 reads data respectively from the block of "B0" of the hard disk device 10 of "HDD0" and from the block of "B1" of the hard disk device 10 of "HDD1" (here, data for initial format stored during initialization is read), restores the data stored in the block of "B2" of the failed hard disk device 10 based on the foregoing read data, and stores this in the block of "B3" in the spare hard disk device 10.

Meanwhile, according to this kind of conventional failure recovery method, since correction copy processing is sequentially performed regarding all stripes in the RAID group 30 subject to a failure (hereinafter referred to as the "failed RAID group 30") regardless of whether user data is written therein, much time is required to perform the failure recovery processing. Particularly in recent years, the time required for the failure recovery processing is of an increasing trend due to the increase in the capacity of hard disk devices.

Nevertheless, the processing performance of the data I/O processing according to a command from the host apparatus 2 will deteriorate during the failure recovery processing since a large part of the processing capacity of the controller 12 will be allocated to the failure recovery processing. Accordingly, if the time required for the failure recovery processing increases, there is a problem in that the deteriorated status of the processing performance of the data I/O processing will continue for a longer period of time.

Thus, the disk array device 4 of this embodiment, in addition to the function of executing the failure recovery processing according to the foregoing conventional method, is loaded with a function for preferentially performing correction copy processing to the stripes storing user data among the stripes in the failed RAID group 30, and performing correction copy processing to the stripes not storing user data during its spare time (i.e., time in which the load is small and the correction copy processing will not affect the processing performance of the data I/O processing according to a request from the host apparatus 2).

As means for realizing this function, the disk array device 4 of this embodiment uses a prescribed bit in the management area in the block storing the parity data of each stripe for managing whether user data is written in the stripe to which such block belongs.

Figure 3:
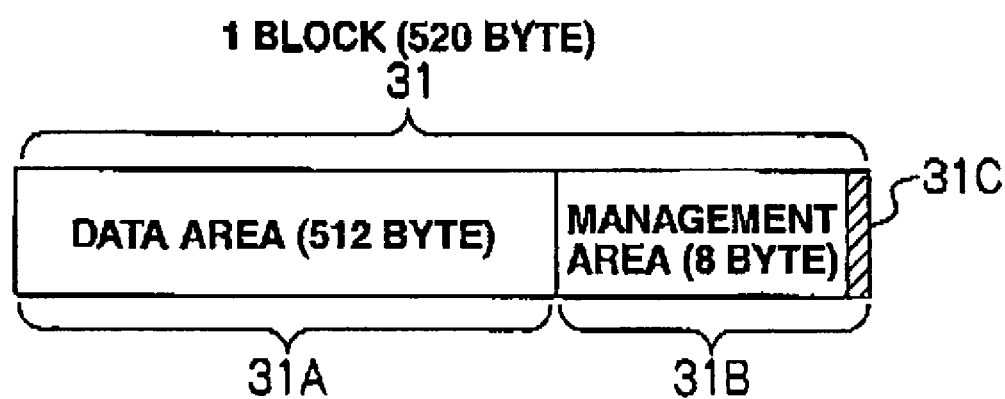
FIG. 3 is a conceptual diagram explaining a write management flag.

Specifically, as shown in FIG. 3, in the hard disk device 10, each block 31 is configured from a 512-byte data area 31A and an 8-byte management area 31B. In this embodiment, 1 bit in the management area 31B is used as a write management flag 31C for managing whether user data is written in the stripe to which such block belongs.

Upon writing user data from the host apparatus 2 into the hard disk device 10, the disk array device 4 turns ON ("1") the write management flag 31C of the management area 31B of the block 31 storing the parity data created based on the user data.

Moreover, in a case where a hard disk device 10 belonging to any one of the RAID groups is blocked due to a failure and the user data stored in the blocked hard disk device 10 is to be correction-copied to a spare hard disk device 10, the disk array device 4 checks the write management flag 31C stored in the management area 31B of the block 31 storing the parity data in each stripe, and determines whether user data is stored in that stripe based on the write management flag 31C.

If the disk array device 4 determines that user data is not stored in that stripe based on the foregoing determination, it does not perform data correction copy processing to that stripe. In other words, the disk array device 4 only executes data correction copy processing to a stripe if it determines that user data is written in that stripe.

At the stage of completing the foregoing processing regarding all stripes in the failed RAID group 30, user data that was lost due to a failure of the hard disk device 10 will be restored completely, and redundancy of the user data is thereby restored. Thus, the disk array device 4 ends the recovery processing to the failed hard disk device 10 at this stage. The disk array device 4 thereafter performs the correction copy processing of data for initial format regarding the stripes not written with user data in the background during its spare time.

Meanwhile, according to the failure recovery processing of this embodiment described above, if there are many stripes written with user data, it will be necessary to confirm the status of the write management flag 31C for each stripe. Thus, there is a problem in that the failure recovery processing of this embodiment may take more time in comparison to the conventional failure recovery method in certain cases.

Thus, the disk array device 4 of this embodiment counts the successive appearance count of stripes in which correction copy processing is to be performed to user data during the failure recovery processing (i.e., stripes with user data written therein), and performs the failure recovery processing by switching from the failure recovery method to the conventional failure recovery method when this count value exceeds a pre-set first threshold value (hereinafter referred to as a "successive write threshold value").

Nevertheless, even when executing the failure recovery processing according to the conventional failure recovery method, the successive appearance count of stripes not written with data is constantly counted by checking the write management flag of the respective stripes, and the failure recovery method is switched to the failure recovery method of this embodiment if the count value exceeds a predetermined second threshold value (hereinafter referred to as the "successive non-write threshold value").

Meanwhile, according to the conventional failure recovery method, there is a problem in that the failure recovery processing will adversely affect the data I/O performance if the number of hard disk devices configuring the RAID group 30

(hereinafter referred to as the "data disk width" as appropriate) exceeds a given number upon restoring the user data and parity data stored in the blocked hard disk device 10.

This is due to the fact that, for instance, although the user data stored in the blocked hard disk device 10 can be calculated with single arithmetic computation if the data disk width is 8 disk devices or less, arithmetic computation must be performed a plurality of times to restore the user data if the data disk width exceeds 8 disk devices, and the load of arithmetic processing for restoring data increases when the data disk width exceeds a given number.

Thus, the disk array device 4 of this embodiment is able to set the maximum data disk width in which the arithmetic processing for restoring data will not adversely affect the data I/O performance as a data disk width boundary value. The disk array device 4 executes the failure recovery processing according to the conventional method if the data disk width of the failed RAID group 30 is less than the data disk width boundary value, and executes the failure recovery processing of the present method if the data disk width of the failed RAID group 30 exceeds the data disk width boundary value.

Meanwhile, it is necessary to give consideration to the RAID level set in the failed RAID group upon adopting the failure recovery method according to the present embodiment described above. This is because the parity count per stripe in RAID 5 is one, and the parity count per stripe in RAID 6 is two.

Thus, if the RAID level of the failed RAID group 30 is set to RAID 5, the disk array device 4 of this embodiment, as shown in FIG. 4, with respect to the stripes (for instance, "STA", "STD" and "STE" of FIG. 4) storing user data in the blocked hard disk device 10, executes the correction copy processing of user data stored in the blocked hard disk device 10 using the user data and parity data stored in the other blocks configuring that stripe. Moreover, the disk array device 4 does not execute the correction copy processing to strips that are not storing user data (for instance, "STB" and "STG" of FIG. 4).

Since the write management flag 31C cannot be checked regarding the stripes that stored parity data in the blocked hard disk device 10 or to which parity data should be stored (for instance, "STC" and "STF" of FIG. 4), the correction copy processing is always executed using the user data stored in the other blocks configuring that stripe as with the case when the write management flag 31C is set to "ON."

Figure 5:
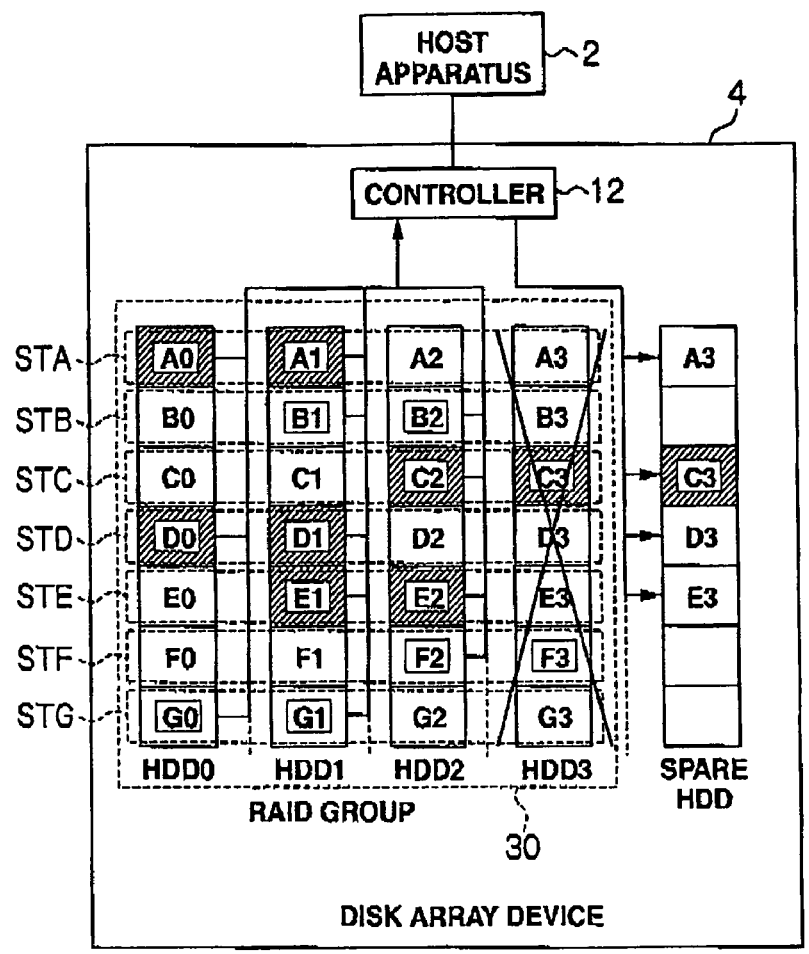
FIG. 5 is a conceptual diagram explaining a failure recovery method according to an embodiment of the present invention when the RAID level of the failed RAID group is RAID 6.

Meanwhile, in a case where the RAID level of the failed RAID group 30 is set to RAID 6 and there is only one blocked hard disk device 10, as shown in FIG. 5, there will always be at least one parity data that can be read into all the stripes.

Thus, in this case, the write management flag 31C is checked regarding all stripes in the failed RAID group 30. With respect to the stripes written with user data (for instance, "STA", "STC" to "STE" of FIG. 5), the correction copy processing of the user data or parity data stored in the blocked hard disk device 10 is executed by reading the user data and parity data from the other blocks configuring that stripe. With respect to the stripes not written with user data (for instance, "STB", "STF" and "STG" in FIG. 5), the correction copy processing of data (data for initial format) stored in the blocked hard disk device 10 is not executed.

Figure 6:
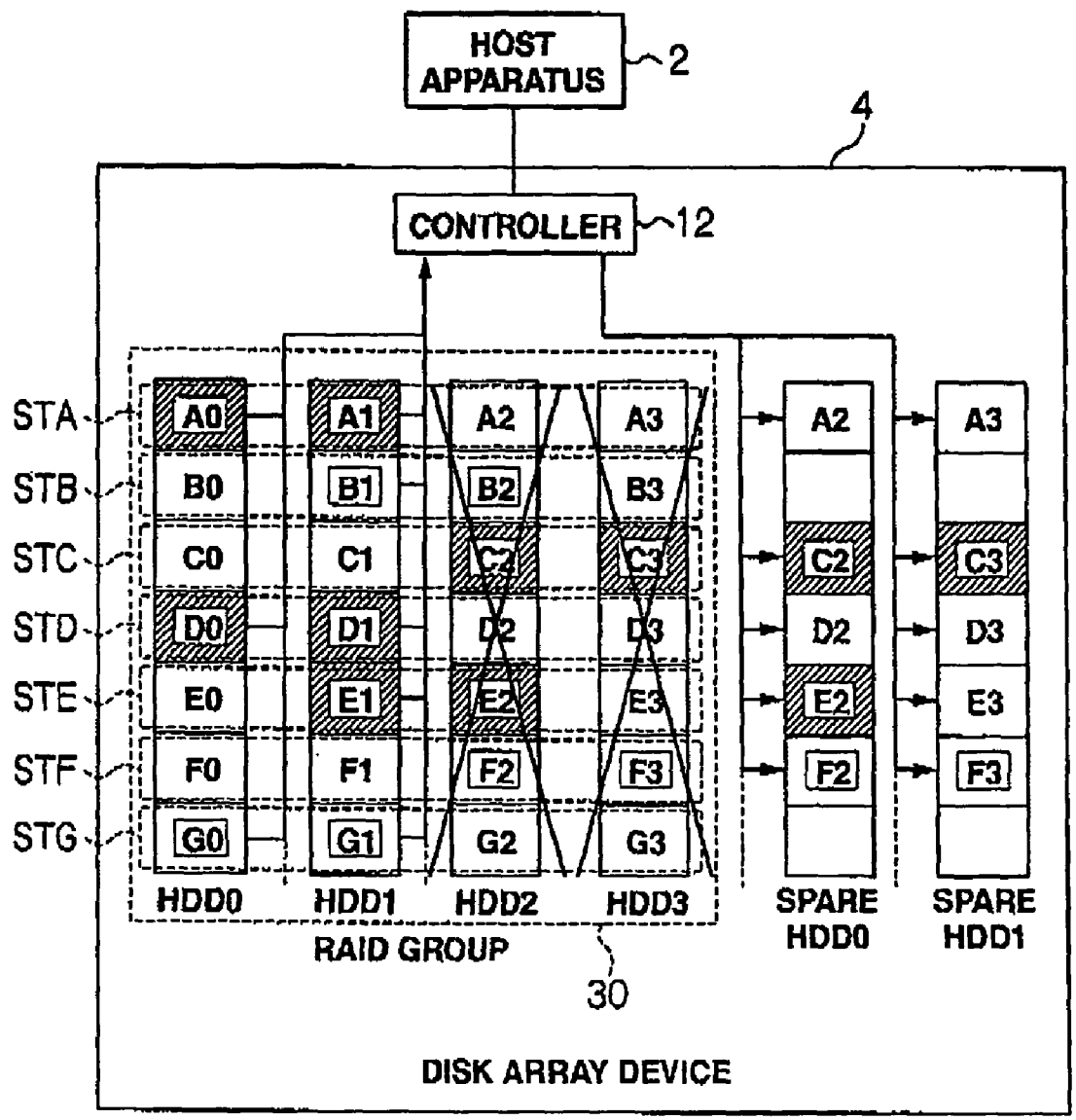
FIG. 6 is a conceptual diagram explaining a failure recovery method according to an embodiment of the present invention when the RAID level of the failed RAID group is RAID 6.

Meanwhile, in a case where the RAID level of the failed RAID group 30 is set to RAID 6 and there are two blocked hard disk devices 10, as shown in FIG. 6, with respect to the stripes storing the user data and parity data respectively in the two blocked hard disk devices 10 (for instance, "STA", "STD" and "STE" in FIG. 6), the correction copy processing of the user data and parity data stored respectively in these blocked hard disk devices 10 is executed using the user data and parity data stored in the other blocks configuring that stripe.

With respect to the stripes not written with user data (for instance, "STB" and "STG" in FIG. 6), the correction copy processing of data (data for initial format) stored in the blocked hard disk device 10 is not executed. In addition, since the write management flag 31C cannot be checked regarding the stripes that stored parity data in both of the blocked hard disk devices 10 or to which parity data should be stored (for instance, "STC" and "STF" of FIG. 6), the correction copy processing of data stored respectively in both of the block hard disk devices 10 is always executed using the user data stored in the other blocks configuring that stripe as with the case when the write management flag 31C is set to "ON."

As means for realizing the failure recovery processing according to the present embodiment described above, the local memory 22 (FIG. 1) of the disk array device 4 stores a RAID group management table 40 as shown in FIG. 7, and a stripe management table 41 for each RAID group as shown in FIG. 8.

Among the above, the RAID group management table 40 is a table for managing the respective RAID groups set in the disk array device 4 and, as shown in FIG. 7, is configured from a RAID group ID column 40A, a data disk width column 40B and a RAID level column 40C.

The RAID group ID column 40A stores the ID to be assigned to each RAID group set in the disk array device 4, and the data disk width column 40B stores the data disk width set to the corresponding RAID group. The RAID level column 40C stores the RAID level set to the corresponding RAID group.

Accordingly, in the case of the example shown in FIG. 7, the data disk width of a RAID group having a group ID of "1" is "4," and the RAID level of that RAID group is set to "RAID 5."

Meanwhile, the stripe management table 41 is a table for managing the respective stripes in the corresponding RAID group and, as shown in FIG. 8, is configured from a stripe ID column 41A, a hard disk device ID column 41B, an LBA column 41C and a parity flag column 41D.

The stripe ID column 41A stores an identifier (hereinafter referred to as a "stripe ID") assigned to each stripe existing in the corresponding RAID group.

The hard disk device ID column 41B stores an identifier (hereinafter referred to as a "device ID") of each hard disk device 10 in which parity data is stored in the corresponding stripe, and the LBA column 41C stores the LBA of the block for storing the parity data in that hard disk device 10.

The parity flag column 41D stores a flag representing that parity data is stored in the corresponding block Specifically, "1" is stored if parity data is stored in the corresponding block, and "0" is stored if parity data is not stored (user data is stored) in the corresponding block Accordingly, in the example shown in FIG. 8, the stripe assigned with a stripe ID of "1" is configured from blocks each having an LBA of "1" in the hard disk devices 10 respectively having a device ID of "1" to "4," and parity data is stored in the block of the hard disk device 10 having a device ID of "1."

The CPU 21 (FIG. 1) of the controller 12 of the disk array device 4 executes the failure restoration processing according to the present embodiment based on the RAID group management table 40 and the stripe management table 41 stored in the local memory 22.

(3) Processing of CPU in Failure Recovery Method of Present Embodiment

The specific processing contents of the CPU 21 in the controller 12 of the disk array device 4 concerning the various types of processing related to the failure recovery method according to the present embodiment described above are now explained.

(3-1) Command Execution Processing

Figure 9:
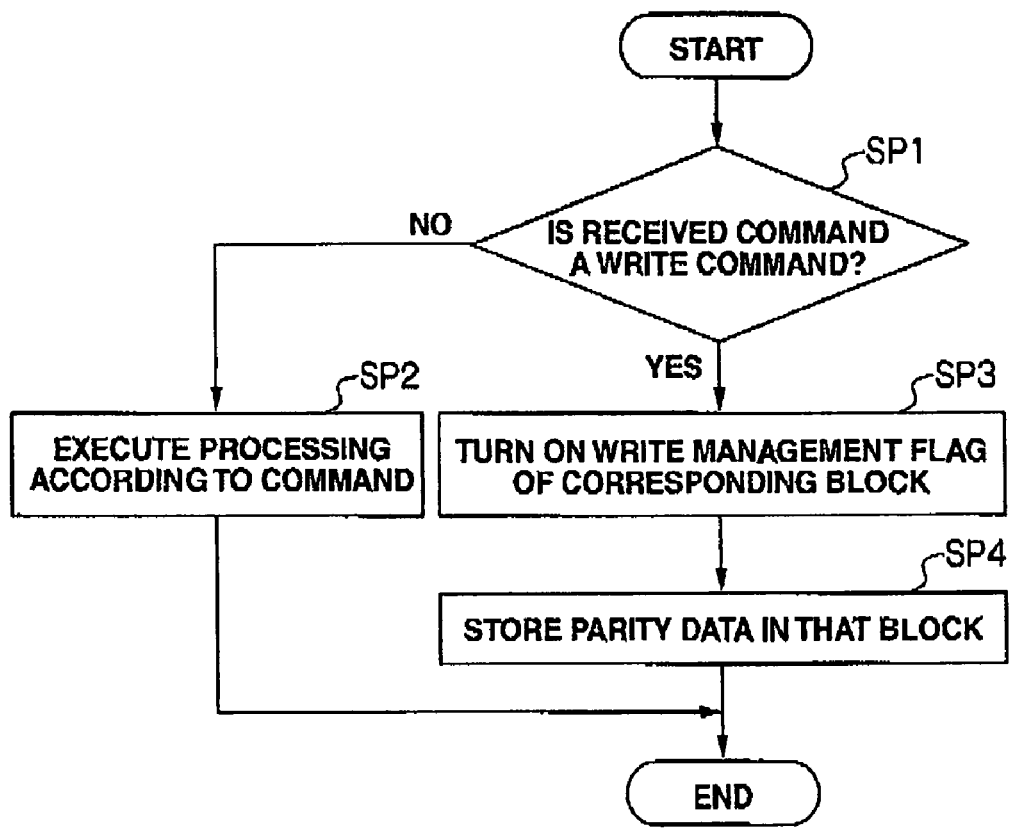
FIG. 9 is a flowchart showing the processing routine of command execution processing.

FIG. 9 shows the processing contents of the CPU 21 concerning the command execution processing. When the CPU 21 receives a command from the host apparatus 2 via the channel interface 20 (FIG. 1) and the data transfer controller 23 (FIG. 1), it executes the command execution processing shown in FIG. 9 according to the micro program stored in the local memory 22.

Specifically, the CPU 21 starts the command execution upon receiving a command from the host apparatus 2, and foremost determines whether the received command is a write command (SP1). If the CPU 21 obtains a negative result in this determination, it executes processing according to that command (SP2), and then ends this command execution processing.

Meanwhile, if the CPU 21 obtains a positive result in the determination at step SP1, it searches for the block for writing parity data created based on the write-target user data provided from the host apparatus 2 together with the write command from the corresponding stripe management table 41, and turns ON the write management flag 31C (FIG. 3) stored in the management area 31B (FIG. 3) of that block (SP3).

Subsequently, the CPU 21 creates parity data based on the write-target user data, and writes the created parity data into the data area 31A (FIG. 3) of the block in which the write management flag 31C was turned ON at step SP3 (SP4). The CPU 21 thereafter ends this command execution processing.

(3-2) Failure Recovery Processing

Figure 10:
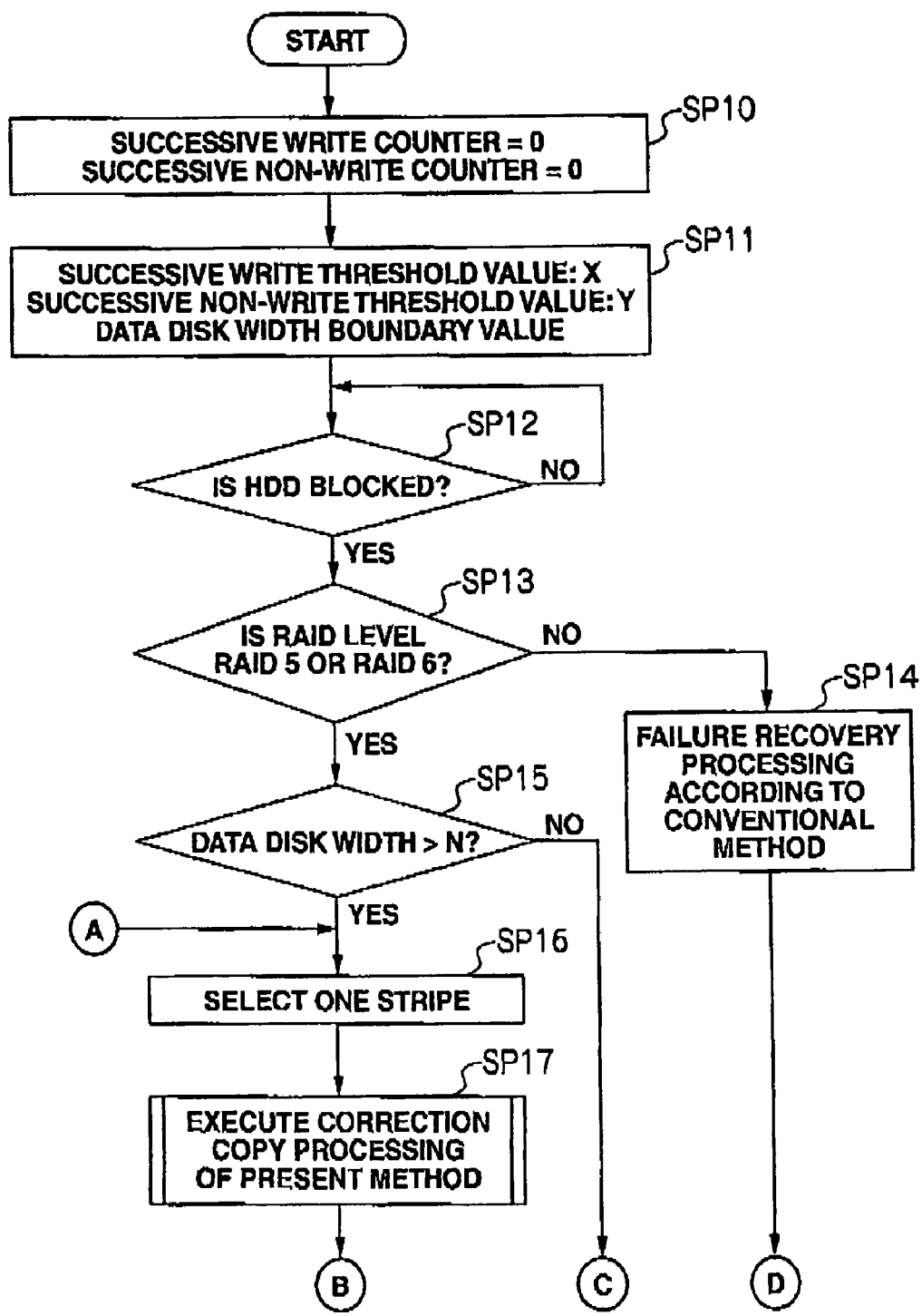
FIG. 10 is a flowchart showing the processing routine of failure recovery processing according to an embodiment of the present invention.
Figure 11:
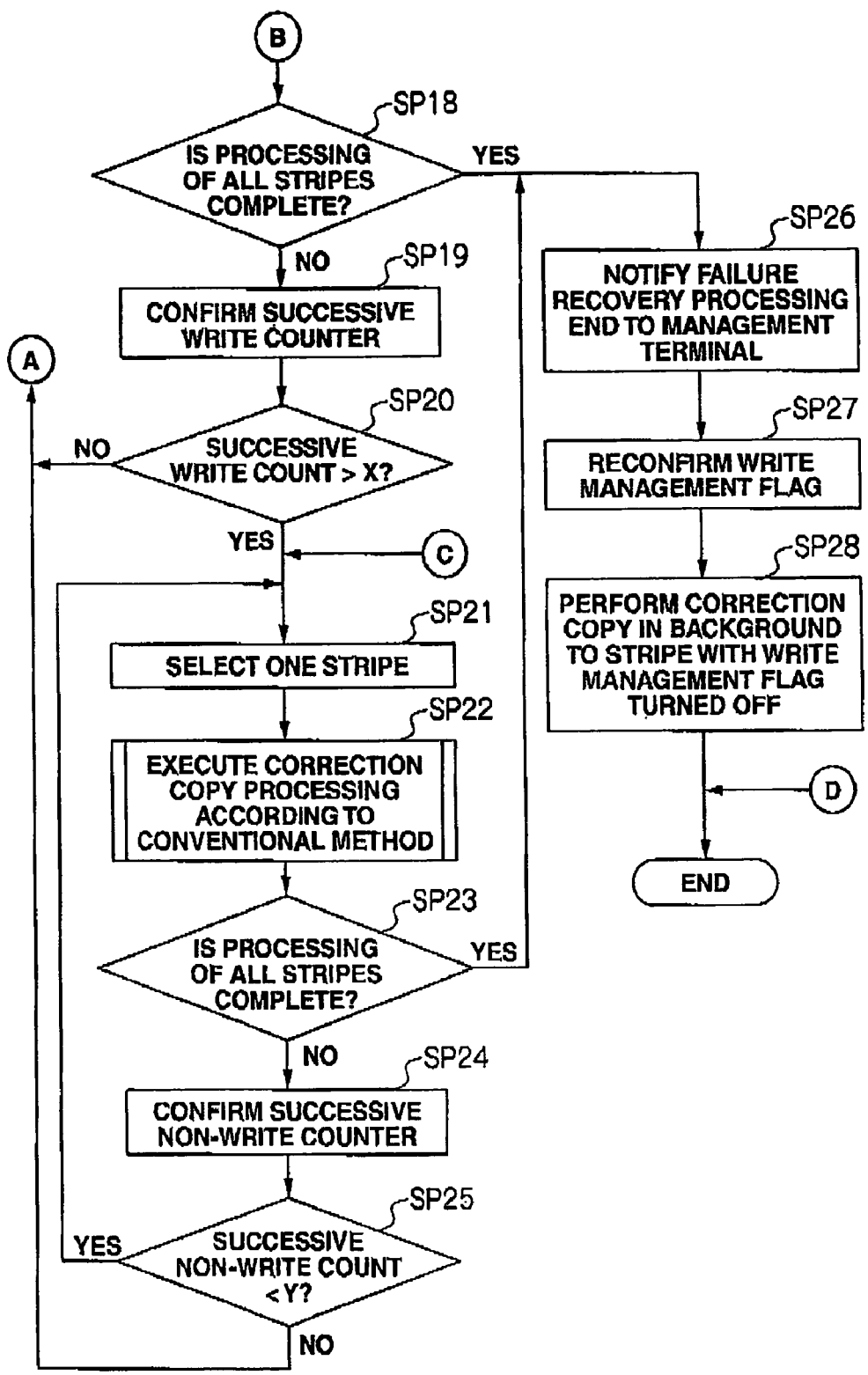
FIG. 11 is a flowchart showing the processing routine of failure recovery processing according to an embodiment of the present invention.

Meanwhile, FIG. 10 and FIG. 11 show the specific processing contents of the CPU 21 when one of the hard disk devices 10 is blocked due to a failure. If one of the hard disk devices 10 is blocked due to a failure, the CPU 21 executes the failure recovery processing shown in FIG. 10 and FIG. 11 based on the micro program stored in the local memory 22.

Specifically, initially, the CPU 21 respectively resets a successive write counter for counting the number of successive stripes (successive write count) written with user data and a successive non-write counter for counting the number of successive stripes (successive non-write count) not written with user data (sets the count value to "0") (SP10).

Subsequently, the CPU 21 respectively sets the successive write threshold value, the successive non-write threshold value and the data disk width boundary value to predetermined values of X, Y and Z (SP11), and thereafter monitors the status of the respective hard disk devices 10 in the disk array device 4 (SP12).

When one of the hard disk devices 10 is eventually blocked due to a failure, the CPU 21 refers to the RAID group management table 40 (FIG. 7), and determines whether the RAID level set to the RAID group (failed RAID group) to which that hard disk device 10 belongs is "RAID 5" or "RAID 6" (SP13).

If the CPU 21 obtains a negative result in this determination, it executes the failure recovery processing according to the conventional method described with reference to FIG. 2 (SP14), and thereafter ends this failure recovery processing.

Meanwhile, if the CPU 21 obtains a positive result in the determination at step SP13, it determines whether the data disk width of that failed RAID group is greater than the data disk width boundary value N set at step SP11 (SP15).

If the CPU 21 obtains a negative result in this determination, it proceeds to step SP21. Contrarily, if the CPU 21 obtains a positive result in this determination, it selects one stripe in the failed RAID group to which correction copy processing has not yet been executed (SP16), and executes the correction copy processing to that stripe according to the method of this embodiment explained later with reference to FIG. 12 (SP17).

Subsequently, the CPU 21 determines whether the correction copy processing has been executed to all stripes in the failed RAID group (SP18), and confirms the current count value of the successive write counter upon obtaining a negative result in this determination (SP19).

Then, the CPU 21 determines whether the count value of the successive write counter has exceeded the successive write threshold value X set at step SP11 (SP20), and returns to step SP16 upon obtaining a negative result in this determination. The CPU 21 thereafter sequentially executes the correction copy processing to the respective stripes in the RAID group while repeating the loop of step SP16 to step SP20 back to step SP16 until it obtains a positive result at step SP18 or step SP20.

Meanwhile, if the CPU 21 obtains a positive result in the determination at step SP20, it selects on stripe to which correction copy processing has not yet been performed (SP21), and executes the correction copy processing to that stripe according to the conventional method described later with reference to FIG. 13 (SP22).

Subsequently, the CPU 21 determines whether the correction copy processing has been performed to all stripes in the failed RAID group (SP23), and confirms the current count value of the successive non-write counter upon obtaining a negative result in this determination (SP24).

Then, the CPU 21 determines whether the count value of the successive non-write counter is smaller than the successive non-write threshold value Y set at step SP11 (SP25), and returns to step SP21 upon obtaining a positive result in this determination. The CPU 21 thereafter sequentially executes the correction copy processing to the respective stripes in the failed RAID group while repeating the loop of step SP21 to step SP25 back to step SP21 until it obtains a positive result at step SP23 or a negative result at step SP25.

When the CPU 21 obtains a positive result in the determination at step SP25, it returns to step SP16, and thereafter sequentially performs the processing of step SP16 onward as described above.

Meanwhile, if the CPU 21 obtains a positive result in the determination at step SP18 or step SP23 as a result of the correction copy processing to all required stripes in the failed RAID group eventually being complete, it notifies that the failure recovery processing end to the management terminal 26 (FIG. 1) (SP26). Consequently, a message to such effect is displayed on the management terminal 26.

Subsequently the CPU 21 reconfirms the status of the write management flag 31C (FIG. 3) of the respective stripes in the failed RAID group (SP27). The CPU 21 thereafter correction-copies the data (data for initial format) stored in the blocked hard disk device 10 to the spare hard disk device 10 in the background in its spare time regarding the stripes in which the write management flag 31C is turned OFF (SP28). The CPU 21 ends this failure recovery processing when the correction copy processing to all stripes in which the corresponding write management flag 31C was turned OFF is complete.

Figure 12:
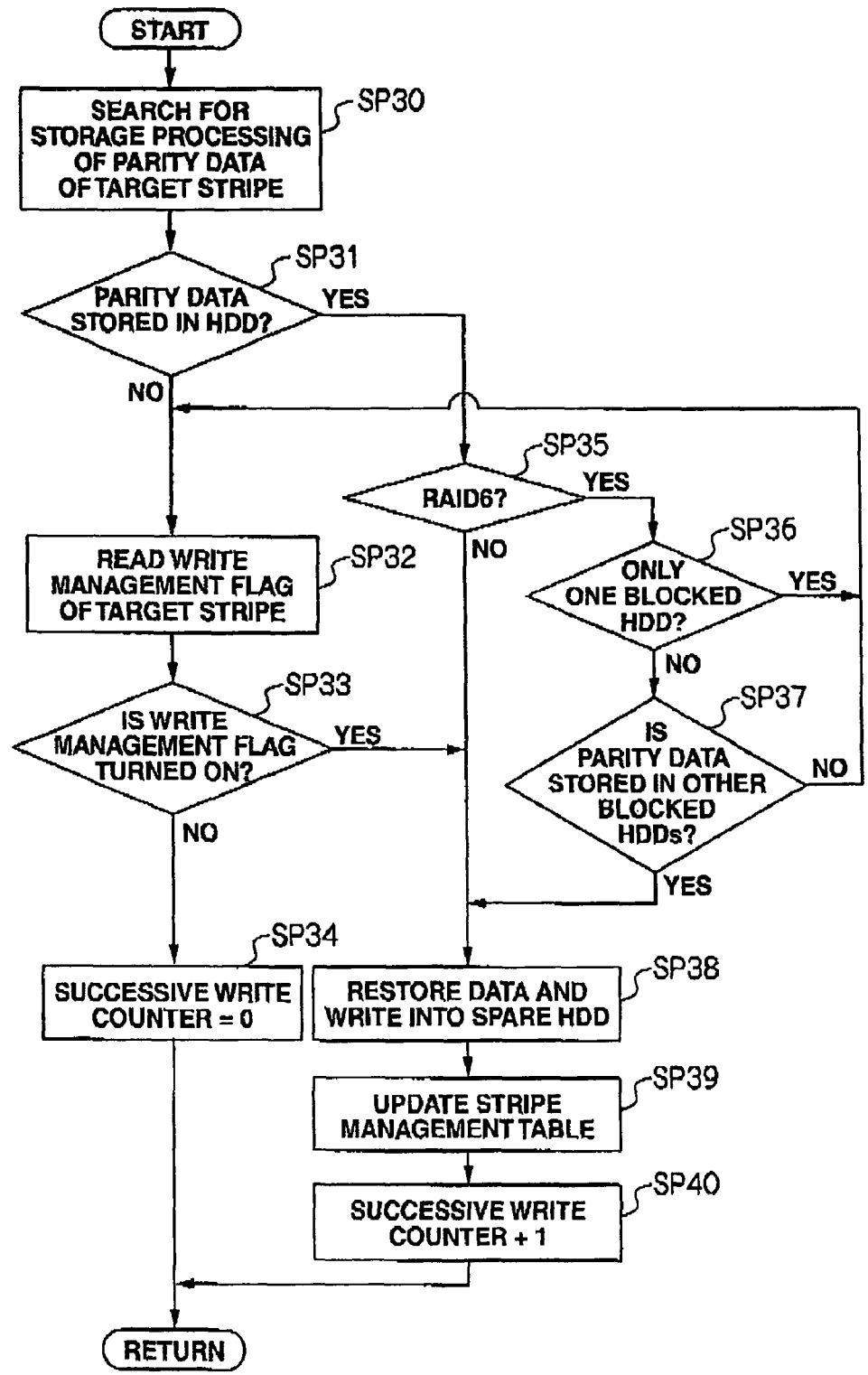
FIG. 12 is a flowchart showing the processing routine of first correction copy processing.

FIG. 12 shows the specific processing contents of the CPU 21 concerning the correction copy processing according to the method of this embodiment performed at step SP17 of the failure recovery processing.

When the CPU 21 proceeds to step SP17 of the failure recovery processing, it starts this first correction copy processing, and foremost searches for the device ID of the hard disk device 10 storing the parity data of the target stripe (hereinafter referred to as the "target stripe"), and the block ID of the blocks storing that parity data in that hard disk device 10 from the corresponding stripe management table 41 (FIG. 8) (SP30).

Subsequently, the CPU 21 determines whether the hard disk device 10 in which the device ID was detected at step SP30 is a blocked hard disk device (SP31). If the CPU 21 obtains a negative result in this determination, it reads the write management flag 31C (FIG. 3) from the management area 31B (FIG. 3) of the block storing the parity data of the target stripe (SP32), and determines whether this write management flag 31C is turned ON (whether user data is stored in the target stripe) (SP33).

If the CPU 21 obtains a negative result in this determination, it resets the successive write counter (SP34), thereafter ends this first correction copy processing, and returns to step SP17 of the failure recovery processing.

Contrarily, if the CPU 21 obtains a positive result in the determination at step SP33, it refers to the corresponding stripe management table 41 (FIG. 8), and reads the user data or parity data stored in the respective blocks in the hard disk device 10 other than the blocked hard disk device 10 and which are blocks configuring that target stripe. The CPU 21 restores the user data stored in the blocked hard disk device 10 based on the read user data or parity data, and writes the restored user data into the corresponding block of the spare hard disk device 10 (SP38).

Subsequently, the CPU 21 rewrites the device ID and LBA respectively stored in the hard disk device ID column 41B and the LBA column 41C related to the target stripe in the corresponding stripe management table 41 with the device ID of the spare hard disk device 10 and the block ID of the block to which the restored user data in the spare hard disk device 10 was written at step SP38 (SP39).

The CPU 21 increments the count value of the successive write counter by "1" (SP40), thereafter ends this first correction copy processing, and returns to step SP17 of the failure recovery processing.

Meanwhile, if the CPU 21 obtains a positive result in the determination at step SP31, it refers to the RAID group management table 40 (FIG. 7), and determines whether the RAID level of the failed RAID group to which the target stripe belongs is set to RAID 6 (SP35).

To obtain a negative result in this determination means that the RAID level of the failed RAID group to which the target stripe belongs is set to RAID 6, and parity data of the target stripe is stored in the blocked hard disk device 10.

Consequently, in this case, the CPU 21 refers to the corresponding stripe management table 41 (FIG. 8), and reads user data stored in the respective blocks in the hard disk device 10 other than the blocked hard disk device 10 and which are blocks configuring the target stripe. The CPU 21 restores the parity data stored in the blocked hard disk device 10 based on the read user data, and writes the restored parity data into the corresponding block of the spare hard disk device 10 (SP38).

Subsequently, the CPU 21 rewrites the device ID and LBA respectively stored in the hard disk device ID column 41B and the LBA column 41C related to the target stripe in the corresponding stripe management table 41 with the device ID of the spare hard disk device 10 and the block ID of the block to which the restored parity data was written at step SP38 (SP39).

The CPU 21 increments the count value of the successive write counter by "1" (SP40), thereafter ends this first correction copy processing, and returns to step SP17 of the failure recovery processing.

To obtain a positive result in the determination at step SP35 means that the RAID level of the failed RAID group to which the target stripe belongs is set to RAID 6, and parity data of the target stripe is stored in the blocked hard disk device 10. Consequently, in this case, the CPU 21 determines whether there is only one blocked hard disk device 10 (SP36).

To obtain a positive result in this determination means that there is one parity data remaining in the target stripe. Consequently, in this case, the CPU 21 proceeds to step SP32, and executes the processing of step SP32 onward as described above.

Meanwhile, if the CPU 21 obtains a negative result in this determination, it refers to the corresponding stripe management table 41 (FIG. 8), and determines whether parity data of the target stripe is also stored in other blocked hard disk devices 10 (SP37).

To obtain a positive result in this determination means that there is one parity data remaining in the target stripe as with the case of obtaining a positive result in the determination at step SP36. Consequently, in this case, the CPU 21 proceeds to step S32, and thereafter executes the processing of step SP32 onward as described above.

Meanwhile, to obtain a negative result in the determination at step SP37 means that two parity data of the target stripe are both stored in the blocked hard disk device 10 and of an unreadable status. Here, let it be assumed that there are two blocked hard disk devices 10.

Consequently, in this case, the CPU 21 refers to the corresponding stripe management table 41, and reads the user data respectively stored in the blocks in the respective hard disk devices 10 other than the two blocked hard disk devices 10 and which are blocks configuring that target stripe. The CPU 21 restores the two parity data stored respectively in the two blocked hard disk devices 10 based on the read user data, and writes each of the restored parity data in the corresponding blocks of the two spare hard disk devices 10 (SP38).

Subsequently, the CPU 21 rewrites the device ID and LBA respectively stored in the hard disk device ID column 41B and the LBA column 41C related to the target strip in the corresponding stripe management table 41 (FIG. 8) with the device ID of the respective spare hard disk devices 10 and the block ID of the blocks in which the restored parity data in the spare hard disk device 10 were written at step SP38 (SP39).

The CPU 21 increments the count value of the successive write counter by "1" (SP40), thereafter ends this first correction copy processing, and returns to step SP17 of the failure recovery processing.

Figure 13:
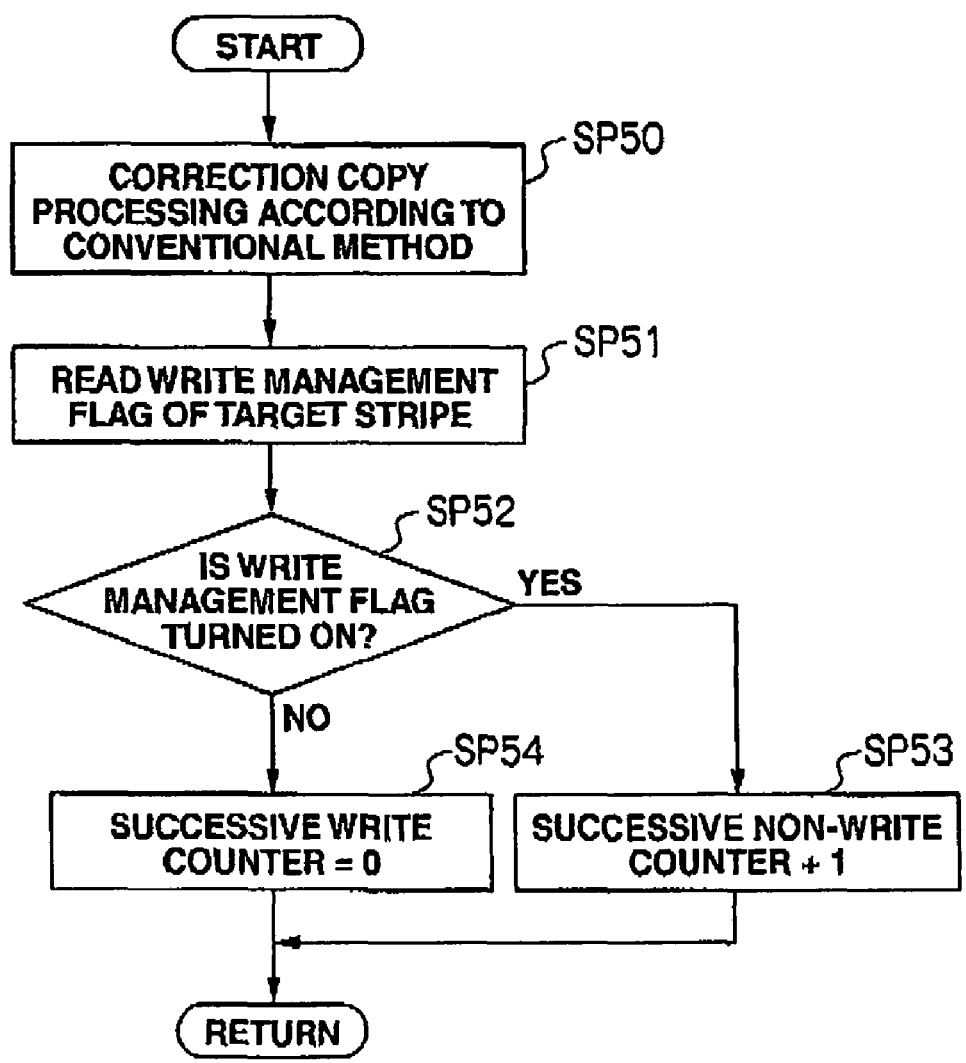
FIG. 13 is a flowchart showing the processing routine of second correction copy processing.

Meanwhile, FIG. 13 shows the specific processing contents of the CPU 21 at step SP22 of the failure recovery processing explained with reference to FIG. 10 and FIG. 11.

Specifically, the CPU 21 starts this second correction copy processing upon proceeding to step SP22 of the failure recovery processing, and executes the correction copy processing according to the conventional method explained with reference to FIG. 2 to the target stripe selected at step SP21 of FIG. 11 (SP50).

Subsequently, the CPU 21 reads the write management flag 31C (FIG. 3) from the management area 31B (FIG. 3) of the blocks storing the parity data of the target stripe (SP51), and determines whether this write management flag 31C is turned ON (whether user data is stored in the target stripe) (SP52).

If the CPU 21 obtains a positive result in this determination, it increments the count value of the successive non-write counter by "1" (SP53), thereafter ends this second correction copy processing, and returns to step SP22 of the failure recovery processing.

Meanwhile, if the CPU 21 obtains a negative result in the determination at step SP52, it resets the successive non-write counter (SP53), thereafter ends this second correction copy processing, and returns to step SP22 of the failure recovery processing.

In the case of this embodiment, if parity data of the target strip is stored in the blocked hard disk device 10, the successive non-write counter is reset at step SP54 since a positive result will be obtained in the determination at step SP52.

(4) Configuration of Various Screens

The screen configuration of the various screens concerning the failure recovery processing of the present embodiment is now explained.

Figure 14:
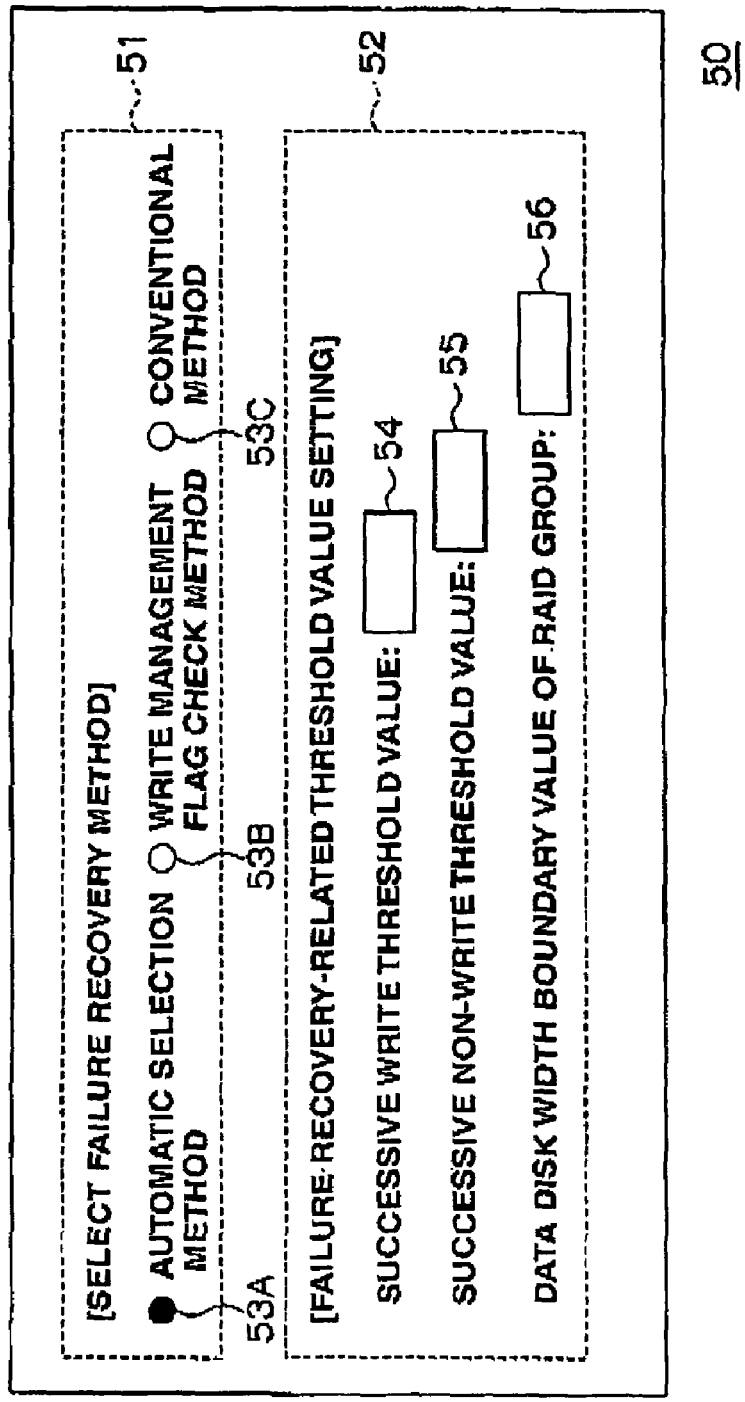
FIG. 14 is a schematic diagram showing the screen configuration of a failure recovery method selection screen.

FIG. 14 shows a failure recovery method selection screen 50 for the user to select the failure recovery method in the disk array device 4 to be displayed on the management terminal 26 (FIG. 1) based on prescribed operations. The failure recovery method selection screen 50 is configured from a failure recovery method selection field 51 and a failure recovery-related threshold value setting field 52.

The failure recovery method selection field 51 displays toggle switches 53A to 53C corresponding respectively to the three types of failure recovery methods; namely, "automatic selection method," "write management flag check method" and "conventional method" as options of the failure recovery method.

Here, the "automatic selection method" is the method of performing the failure recovery processing by switching between the failure recovery method according to the present embodiment and the conventional failure recovery method as necessary as explained with reference to FIG. 2, and the "write management flag check method" is the method of performing the failure recovery processing only with the failure recovery method according to the present embodiment without switching to the conventional failure recovery method. Moreover, the "conventional method" is the method of performing correction copy to data (user data, parity data or data for initial format) stored in the blocked hard disk device 10 regarding all stripes in the failed RAID group without checking the write management flag.

The user is able to select the intended failure recovery method by clicking the toggle switch 53A to 53C corresponding to the intended failure recovery method among the three failure recovery methods displayed in the failure recovery selection method field 51.

The failure recovery-related threshold value setting field 52 is provided with a successive write threshold value input column 54, a successive non-write threshold value input column 55 and a data disk width boundary value input column 56. By inputting the intended successive write threshold value, successive non-write threshold value and data disk width boundary value respectively in the successive write threshold value input column 54, the successive non-write threshold value input column 55 and the data disk width boundary value input column 56, the user is able to set the input successive write threshold value, successive non-write threshold value and data disk width boundary value as the successive write threshold value, successive non-write threshold value and data disk width boundary value.

The failure recovery method as well as the successive write threshold value, successive non-write threshold value and data disk width boundary value set as described above are respectively stored and retained in the cache memory 24 (FIG. 1) via the CPU 21 and the data transfer controller 23 (FIG. 1). Consequently, the successive write threshold value, successive non-write threshold value and data disk width boundary value are read from the cache memory 24 and set at step SP10 of the failure recovery processing explained with reference to FIG. 10 and FIG. 11.

Meanwhile, FIG. 15 shows a failure recovery status display screen 60. The failure recovery status display screen 60 is a screen to be displayed on the management terminal upon executing the failure recovery processing, and displays the status of the respective hard disk devices 10. Here, a character string of "Normal" is displayed regarding the hard disk devices 10 that is not subject to a failure, and a character string of "Blocked" is displayed regarding the hard disk device 10 that is blocked due to a failure or the like.

With respect to the hard disk devices 10 undergoing the correction copy processing of data stored based on the failure recovery processing according to the present embodiment or the conventional failure recovery processing, a character string of "Recovering" and the rate or progress representing how much of the data restoration processing is complete are displayed.

(5) Effect of Present Embodiment

According to the disk array device 4 of the present embodiment, since correction copy processing is preferentially performed to the stripes written with user data of the blocked hard disk device 10, and correction copy processing is thereafter preformed to the stripes not written with user data during its spare time in the background based on the write management flag 31C, it is possible to shorten the time that the processing performance of the data I/O processing will deteriorate as a result of executing the correction copy processing. Consequently, the failure recovery processing can be executed while reducing performance deterioration.

In a case where the CPU 21 is to manage the write management flag 31C in the local memory 22, the capacity of the local memory 22 may be compressed pursuant to the subsequent increase in capacity of the hard disk devices 10. Nevertheless, with the disk array device 4 according to the present embodiment, since the write management flag 31C is retained in the hard disk device 10, it is possible to effectively prevent the foregoing situation from occurring.

(6) Other Embodiments

Although the foregoing embodiments explained a case of applying the present invention to the disk array device 4 configured as shown in FIG. 1, the present invention is not limited thereto, and may also be broadly applied to storage apparatuses of various configurations. In this case, the storage mediums to be mounted on the storage apparatus are not limited to hard disk devices, and may also be optical disks or semiconductor memories.

Further, although the foregoing embodiments explained a case of turning OFF the status of the write management flag 31C corresponding to the stripes not written with user data and turning ON the status of the write management flag 31C corresponding to the stripes written with user data, the present invention is not limited thereto, and the status of the write management flag 31C corresponding to the stripes not written with user data may be turned ON and the status of the write management flag 31C corresponding to the stripes written with user data may be turned OFF.

Moreover, although the foregoing embodiments explained a case of using 1 bit in the management area 31B of the corresponding block 31 (FIG. 3) in the hard disk device 10 as the write management flag 31C, the present invention is not limited thereto, and a bitmap provided with bits corresponding to the respective stripes maybe prepared in the local memory or cache memory of the hard disk device or controller, and the write status of user data in the respective stripes may be managed using such bitmap.

In addition, although the foregoing embodiments explained a case of equipping the CPU 21 with a function as the management unit for managing whether user data is written in each stripe regarding a storage area provided by the RAID group 30, and a function as the correction copy processing execution unit for executing the correction copy processing to each stripe when a hard disk device 10 is blocked due to a failure, the present invention is not limited thereto, and the function as the management unit may also be loaded in the disk interface 25.

The present invention can be broadly applied to storage apparatuses of various configurations that distributively write user data provided from a host apparatus, together with redundant data created based on such user data, into a plurality of storage mediums.

What is claimed is:

1. A storage apparatus which distributively writes user data provided from a host apparatus, together with redundant data created based on the user data, into a plurality of storage mediums, comprising:
   a management unit for managing whether the user data is written in each stripe, which is a unit area for reading and writing the user data, in a storage area provided by the plurality of storage mediums; and
   a correction copy processing execution unit for executing to each of the stripes correction copy processing of recovering, when any one of the storage mediums is blocked due to a failure, data stored in that storage medium and copying the data to a spare storage medium; and
   wherein the correction copy execution unit executes the correction copy processing to the stripe written with the user data in preference to the stripe not written with the user data in a storage area provided by the plurality of storage mediums, and executes the correction copy processing to the stripe not written with the user data in a storage area provided by the plurality of storage mediums during its spare time,
   wherein a corresponding flag is provided to each of the stripes;
   wherein, when user data from the host apparatus is written into a storage area provided by the plurality of storage mediums, the management unit changes the status of the flag associated with the stripe written with the user data to a prescribed status; and
   wherein the failure recovery unit determines whether the user data is written into a target stripe based on the status of the flag upon executing the correction copy processing to the stripe written with the user data.

2. The storage apparatus according to claim 1, wherein each flag is retained in a storage medium of the plurality of storage mediums.

3. The storage apparatus according to claim 2, wherein the storage medium retaining the flap is the storage medium storing the redundant data.

4. A storage apparatus which distributively writes user data provided from a host apparatus, together with redundant data created based on the user data, into a plurality of storage mediums, comprising:
   a management unit for managing whether the user data is written in each stripe, which is a unit area for reading and writing the user data, in a storage area provided by the plurality of storage mediums; and
   a correction copy processing execution unit for executing to each of the stripes correction copy processing of recovering, when any one of the storage mediums is blocked due to a failure, data stored in that storage medium and copying the data to a spare storage medium; and
   wherein the correction copy execution unit executes the correction copy processing to the stripe written with the user data in preference to the stripe not written with the user data in a storage area provided by the plurality of storage mediums, and executes the correction copy processing to the stripe not written with the user data in a storage area provided by the plurality of storage mediums during its spare time,
   wherein the plurality of storage mediums configure a RAID (Redundant Array of Inexpensive Disks) group; and
   wherein the failure recovery unit switches the failure recovery method when a storage medium is blocked from a first failure recovery method that executes data restoration processing to the stripe written with the user data in preference to the stripe not written with the user data to a second failure recovery method that executes data restoration processing to all the stripes based on at least one among the number of times that the stripe written with the user data successively appeared, quantity of the storage mediums configuring the RAID group, and the RAID level set to the RAID group.

5. A failure recovery method in a storage apparatus which distributively writes user data provided from a host apparatus, together with redundant data created based on the user data, into a plurality of storage mediums, comprising:
   a first step of managing whether the user data is written in each stripe, which is a unit area for reading and writing the user data, in a storage area provided by the plurality of storage mediums; and
   a second step of executing to each of the stripes correction copy processing of recovering, when any one of the storage mediums is blocked due to a failure, data stored in that storage medium and copying the data to a spare storage medium;
   wherein, at the second step, the correction copy processing is executed to the stripe written with the user data in preference to the stripe not written with the user data in a storage area provided by the plurality of storage mediums, and the correction copy processing is executed to the stripe not written with the user data in a storage area provided by the plurality of storage mediums during spare time,
   wherein a corresponding flag is provided to each of the stripes;
   wherein, at the first step, when user data from the host apparatus is written into a storage area provided by the plurality of storage mediums, status of the flag associated with the stripe written with the user data is changed to a prescribed status; and
   wherein, at the second step, whether the user data is written into a target stripe based on the status of the flag is determined upon executing the correction copy processing to the stripe written with the user data.

6. The failure recovery method according to claim 5, wherein each flag is retained in a storage medium of the plurality of storage mediums.

7. The failure recovery method according to claim 6, wherein the storage medium retaining the flags is the storage medium storing the redundant data.

8. A failure recovery method in a storage apparatus which distributively writes user data provided from a host apparatus, together with redundant data created based on the user data, into a plurality of storage mediums, comprising:

a first step of managing whether the user data is written in each stripe, which is a unit area for reading and writing the user data, in a storage area provided by the plurality of storage mediums; and a second step of executing to each of the stripes correction copy processing of recovering, when any one of the storage mediums is blocked due to a failure, data stored in that storage medium and copying the data to a spare storage medium; and wherein, at the second step, the correction copy processing is executed to the stripe written with the user data in preference to the stripe not written with the user data in a storage area provided by the plurality of storage mediums, and the correction copy processing is executed to the stripe not written with the user data in a storage area provided by the plurality of storage mediums during spare time, wherein the plurality of storage mediums configure a RAID (Redundant Array of Inexpensive Disks) group; and wherein, at the second step, the failure recovery method when a storage medium is blocked is switched from a first failure recovery method that executes data restoration processing to the stripe written with the user data in preference to the stripe not written with the user data to a second failure recovery method that executes data restoration processing to all the stripes based on at least one among the number of times that the stripe written with the user data successively appeared, quantity of the storage mediums configuring the RAID group, and the RAID level set to the RAID group.

* * * * *